United States Patent
Peljto

(10) Patent No.: US 7,308,382 B2
(45) Date of Patent: Dec. 11, 2007

(54) DETERMINING THE MINIMUM OPERATION AND SHUTDOWN TIME

(75) Inventor: Haso Peljto, Brooklyn Park, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 45 days.

(21) Appl. No.: 11/034,537

(22) Filed: Jan. 13, 2005

(65) Prior Publication Data

US 2005/0159920 A1    Jul. 21, 2005

Related U.S. Application Data

(60) Provisional application No. 60/537,047, filed on Jan. 16, 2004.

(51) Int. Cl.
*G06F 11/30* (2006.01)

(52) U.S. Cl. .................... 702/182; 702/198

(58) Field of Classification Search ........... 702/179, 702/182, 189, 198; 700/286, 306; 318/140, 318/145; 60/204, 286; 714/26; 706/45, 706/57; 376/175, 207
See application file for complete search history.

(56) References Cited

U.S. PATENT DOCUMENTS 4,328,556 A * 5/1982 Abe et al. .................. 700/23
5,761,090 A * 6/1998 Gross et al. ................ 714/26
6,021,402 A * 2/2000 Takriti ....................... 705/412

OTHER PUBLICATIONS

Wong et al., 'GA Approach to Scheduling of Generator Units', Oct. 2000, IEEE Publication, pp. 129-133.*
Smith et al., 'Adaptive Fuzzy Control of Combined Cycle Plant Start Up', Mar. 1996, IEEE Publication No. 419, pp. 115-118.*
Purushothama et al., 'Unit committment using a stochastic extended neighbourhood search', Jan. 2003, IEEE Publication, vol. 150, No. 1, pp. 67-72.*

* cited by examiner

*Primary Examiner*—Hal Wachsman
*Assistant Examiner*—Elias Desta

(57) ABSTRACT

A system and method for determining minimum operation and startup for a generator are described herein. A method and system according to the invention may include assigning a binary value to one or more commitment status variables each associated with an increment of time. The method and system may also assign a binary value to a time-dependent startup status variable. The method and system may implement the following constraints. The startup status variable minus the current commitment variable plus the subsequent previous commitment status variable is greater than or equal to zero, the startup status variable plus the subsequent previous commitment status variable is less than or equal to one, and the startup status variable minus the current commitment status variable is less than or equal to zero. The method and system may also include a constraint that a sum of all commitment status variables is greater than or equal to the product of the startup status variable and a minimum time-on variable wherein the minimum time-on variable is equal to a minimum operation time for the generator.

20 Claims, 6 Drawing Sheets

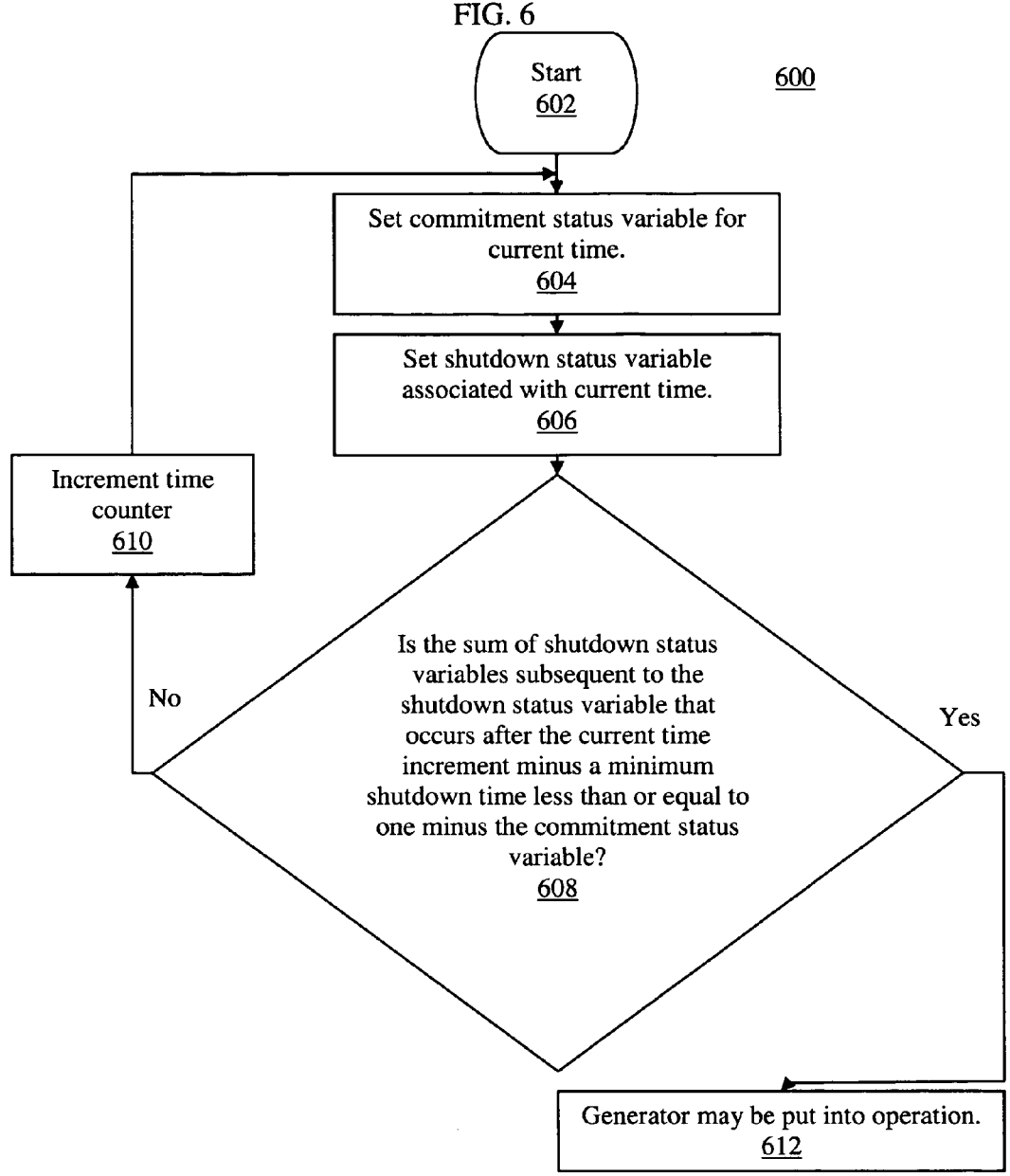

DETERMINING THE MINIMUM OPERATION AND SHUTDOWN TIME

CROSS REFERENCE TO RELATED APPLICATIONS

This application claims the benefit of U.S. Provisional Patent Application entitled "MIN UP AND DOWN TIME CONSTRAINTS" filed Jan. 16, 2004, Ser. No. 60/537,047 which is hereby incorporated by reference in its entirety.

FIELD OF THE INVENTION

The present invention relates in general to electrical generators modeling, and, more particularly, to a method and system for modeling and determining the shutdown and operation time for a generator.

BACKGROUND OF THE INVENTION

A generator converts mechanical energy to electrical energy. An Alternating Current (AC) generator is comprised of two primary components: a rotor and a stator. The rotor is made up of electrically conductive coils that form a rotor winding. The stator is also made up of coils that form a stator winding. Mechanical energy turns the rotor relative to the stator while a field current is passed through the rotor winding to induce a voltage on the stator winding. The induced power in the stator winding is supplied to loads that are powered by the generator. The electrical energy produced by the generator should be equal to the amount of electrical energy consumed by the loads.

Power plants often have multiple generators to supply power for various loads of a community. Examples of loads within the community may include lighting, heating, cooling, appliances, and other machinery. The community's demand for power often fluctuates throughout the day and based on the time of year. During a daily cycle the demand may peak during the evening hours and fall at night when most people are asleep. The yearly demand cycle for power may peak during summer months due to the increased use of air conditioning. The power plant needs to be able to increase and decrease the amount of energy supplied. The power plant may shut down one or more generators, thereby reducing the amount of electrical energy produced. During periods when the community has an increased demand, the power plant may restart generators that have been off-line to supply the additional energy demand of the community.

In addition to shutting down generators to meet the current load of the community, generators must also be shut down for routine maintenance and repair. For example, some generators may need to be shut down after periods of high use to prevent overheating and destruction of the various parts of the generator. The time and costs for shutting down and starting a generator may vary depending on the type of generator and the size of the generator. For example, a large generator powered by nuclear fuel may require considerably greater cost to shut down and start compared to a smaller diesel fuel, substation generator. In addition, some generators are designed to be very efficient at their optimal running speed, but have very slow ramp-up rates and require incremental warmth-dependent startup which adds to the startup costs. Other factors that can affect shutdown time and costs may include equipment availability, for example boilers, steam turbine generators, combustion turbine, chillers, powerhouse auxiliaries, and air compressors. Other factors that may affect startup and shutdown may include the current electricity prices, generator fuel costs, and costs for ancillary components such as air and chilled water. The amount of pollutants produced by the power plant during specific periods of time may also affect the decision to shut down and start specific generators.

The complexity and huge quantity of factors can make determining the minimum operation and shutdown time a complicated process. Accordingly, an efficient and effective system and method to model and optimize the operation and shutdown time for a generator is needed. In view of the foregoing, it would be desirable to provide systems and methods that can determine, model and optimize the operation and shutdown time.

SUMMARY OF THE INVENTION

It is, therefore, an object of the present invention to provide systems and methods that determine the shutdown and operation of a generator. These and other objects of the invention are provided in accordance with the principles of the present invention. A method according to exemplary embodiments of the invention may include assigning a binary value to one or more commitment status variables each associated with an increment of time. The method may also include assigning a binary value to a time-dependent startup status variable. The startup status variable minus the current commitment status variable plus the subsequent previous commitment status variable may be greater than or equal to zero, the startup status variable plus the subsequent previous commitment status variable may be less than or equal to one, and the startup status variable minus the current commitment status variable may be less than or equal to zero. The method may then determine generator operations based on assigned status values.

In another aspect of the invention, the method may entail the sum of all commitment status variables being greater than or equal to the product of the startup status variable and a minimum time-on variable wherein the minimum time-on variable is equal to a minimum operation time for the generator. Another aspect of the invention may further include assigning a binary value to one or more time-dependent shutdown status variables. According to this aspect, the shutdown status variable plus the current commitment status variable minus the subsequent previous commitment status variable may be greater than or equal to zero, the shutdown status variable minus the subsequent previous commitment status variable may be less than or equal to zero, and the shutdown status variable plus the current commitment status variable may be less than or equal to one. In an alternate aspect of the invention, the sum of all commitment status variables may be less than or equal to the product of one minus the shutdown status variable and a minimum time-off variable. In yet another aspect, the sum of shutdown status variables subsequent to the shutdown status variable that occurs after the current time increment minus a minimum shutdown time may be less than or equal to one minus the commitment status variable.

Aspects of the invention as described in the exemplary methods of the invention may be implemented in an exemplary system of the invention. The exemplary aspects of the invention may be implemented through hardware or software.

BRIEF DESCRIPTION OF THE DRAWINGS

The above and other objects and advantages of the present invention will be apparent upon consideration of the following detailed description, taken in conjunction with the accompanying drawings, in which like reference numbers refer to like parts throughout, and in which:

FIG. 6 is a flow chart illustrating an alternate exemplary shutdown time routine 600 for modeling and determining a minimum shutdown time for a generator in accordance with the principles of the present invention.

DETAILED DESCRIPTION OF THE INVENTION

Figure 1:
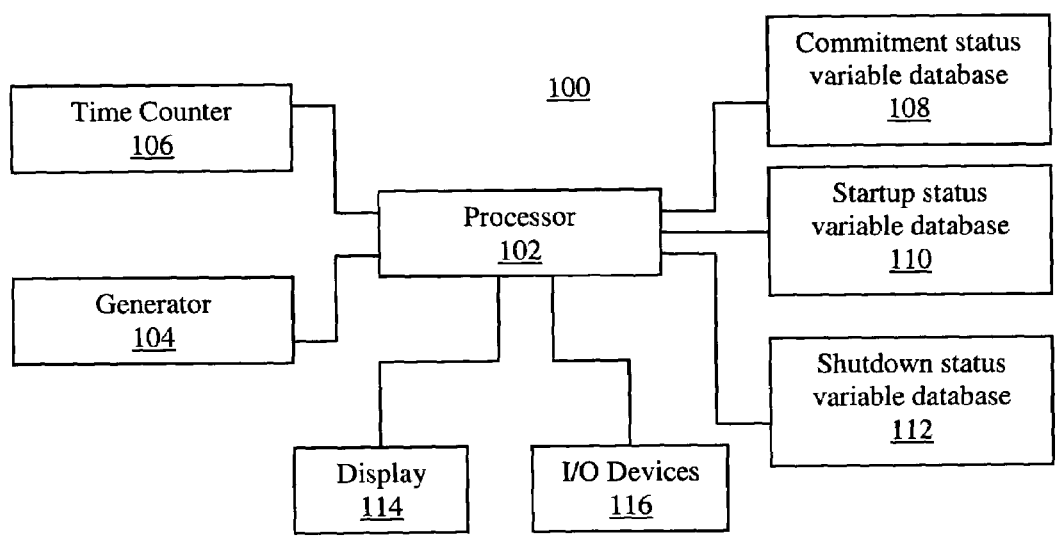
FIG. 1 is a schematic diagram of an exemplary system 100 constructed in accordance with the principles of the present invention for determining minimum operation and shutdown time for a generator.

The present invention provides a model and constraints that allow for the determination of the operation and shutdown of the generator. A counter provides the time frame for the model. The counter is initiated at the point in time when the generator is started or shut down. The counter provides increments of time represented as $t_1, t_2, \ldots t_k$. The increments of time can be represented in units of, for example, minutes, hours, or days. The units may be based on the scale of the model and/or the characteristics of the generator being modeled.

The startup status of the generator is represented by a startup status variable $z^t$. The startup status variable can be assigned a binary value. The startup status variable is set equal to one when the generator is in the process of starting up. During all other stages the startup status variable is equal to zero. For each increment of time, as previously discussed, a startup status variable $z^t$ represents the startup status of the generator for the respective increment of time. For example, the startup status variables $z^1$ and $z^2$ represent the startup status of the generator for time increments $t_1$ and $t_2$.

The shutdown status of the generator is represented by a shutdown status variable $x^t$. The shutdown status variable can be assigned a binary value. The shutdown status variable is set equal to one when the generator is in the process of shutting down. During all other stages the shutdown status variable is equal to zero. For each increment of time, as previously discussed, a shutdown status variable $x^t$ represents the shutdown status of the generator for the respective increment of time. Similar to the startup status variable, the shutdown status variables $x^1$ and $x^2$ represent the shutdown status of the generator for time increments $t_1$ and $t_2$.

The commitment status of the generator is represented by a commitment status variable $y^t$. The commitment status variable can be assigned a binary value. The commitment status variable is set equal to one when the generator is dedicated to operation. During all other stages the commitment status variable is equal to zero. For each increment of time, as previously discussed, a commitment status variable $y^t$ represents the commitment status of the generator for the respective increment of time. Similar to the startup status variable, the commitment status variables $y^1$ and $y^2$ represent the commitment status of the generator for time increments $t_1$ and $t_2$.

The time-dependent variables for determining operation and shutdown can be summarized as follows:

$z^t=\{$0-representing a unit not starting up status; 1- representing a unit starting up status$\}$ $x^t=\{$0-representing a unit not shutting down status; 1-representing a unit shutting down status$\}$ $y^t=\{$0-representing an off unit commitment status; 1-representing an on unit commitment status$\}$ The system and method uses the above defined variables and a set of startup constraints to define the generator's operation. Three startup constraints of the exemplary embodiment are as follows:

$$z^t - y^t + y^{t-1} \geq 0$$

$$z^t + y^{t-1} \leq 1$$

$$z^t - y^t \leq 0$$

The first startup constraint may require that the current startup status variable minus the current commitment variable plus the subsequent previous commitment status variable be greater than or equal to zero. The second startup constraint may require the current startup status variable plus the subsequent previous commitment status variable be less than or equal to one. The third startup constraint may require that the startup status variable minus the current commitment status variable is less than or equal to zero. The three startup constraints are used to define the generator's operation and are discussed later herein in reference to FIG. 2.

The system and method also uses the above-defined variables and a set of shutdown constraints to define the generator's operation. Three shutdown constraints of the exemplary embodiment are as follows:

$$x^t + y^t - y^{t-1} \geq 0$$

$$x^t - y^{t-1} \leq 0$$

$$x^t + y^t \leq 1$$

The first shutdown constraint may require that the current shutdown status variable plus the current commitment status variable minus the subsequent previous commitment status variable is greater than or equal to zero. The second shutdown constraint may require that the shutdown status variable minus the subsequent previous commitment status variable is less than or equal to zero. The third shutdown constraint may require that the shutdown status variable plus the current commitment status variable is less than or equal to one. The three shutdown constraints are used to define the generator's operation and are discussed later herein in reference to FIG. 3.

The system and method may use the startup constraints and a minimum operation constraint to determine the minimum operation time for the generator. The minimum operation constraint may be defined as follows:

$$y^{t+1} + y^{t+2} + \ldots + y^{t+T_{on}} \geq Z^t * T^{on}$$

The minimum operation constraint may require that the sum of all commitment status variables is greater than or equal to the product of the startup status variable and a minimum time-on variable. The minimum time-on variable, represented by $T_{on}$, may be equal to a minimum operation time for the generator. In one exemplary use of the invention, the minimum operation constraint may be used to control the operation of the generator. In addition to this example, the invention may also use the minimum operation constraint to determine the minimum operation time based on the other variables signaled by the generator. The minimum operation constraint may be used to model and determine when a generator may be shut down as discussed later herein in reference to FIG. 4.

The system and method may use the shutdown constraints and a minimum operation constraint to determine the minimum shutdown time for the generator. The minimum shutdown constraint may be defined as follows:

$$y^{t+1} + y^{t+2} + \ldots + y^{t+T_{off}} \leq (1-x^t)^* T_{off}$$

The minimum shutdown constraint may require that the sum of all commitment status variables is less than or equal to the product of one minus the shutdown status variable and a minimum time-off variable wherein the minimum time-off variable is equal to a minimum shutdown time for the generator. The minimum time-off variable, represented by $T_{off}$, may be equal to a minimum shutdown time for the generator. In one exemplary use of the invention, the minimum shutdown constraint may be used to control the operation of the generator. In addition to this example, the invention may also use the minimum shutdown constraint to determine the minimum shutdown time based on the other variables signaled by the generator. The minimum shutdown constraint may be used to model and determine when a generator may be put into operation as discussed later herein in reference to FIG. 5.

The system and method may use the shutdown constraints and an alternative minimum operation constraint to determine the minimum shutdown time for the generator. The alternate minimum shutdown constraint may be defined as follows:

$$x^{t-0} + x^{t-1} + \ldots + x^{t-(T_{off}-1)} \leq 1 - y^t$$

The alternate minimum shutdown constraint may require that the sum of shutdown status variables subsequent to the shutdown status variable that occurs after the current time increment minus a minimum shutdown time is less than or equal to one minus the commitment status variable wherein the minimum time-off variable is equal to a minimum shutdown time for the generator. The minimum time-off variable, represented by $T_{off}$, may be equal to a minimum shutdown time for the generator. Similar to the first exemplary minimum shutdown constraint, the alternate minimum shutdown constraint may be used to control the operation of the generator or to determine the minimum shutdown time based on the other variables signaled by the generator. The alternate minimum shutdown constraint is used to model and determine when a generator may be put into operation as discussed later herein in reference to FIG. 6.

In the exemplary embodiment the startup status variables, the shutdown status variables, and the commitment status variables are binary values; however, the present invention is not limited to the startup status variables, the shutdown status variables, and the commitment status variables being binary values. These variables may be other values as would be appreciated by one of ordinary skill in the art. For example, the startup status variables and/or the shutdown status variables and/or the commitment status variables can be numeric values or other symbolic values. In this example, an additional process may be incorporated to scale, round, or truncate the values. The model may then use variables in a similar fashion as previously described in the exemplary embodiment.

FIG. 1 is a schematic diagram of an exemplary system 100 constructed in accordance with the principles of the present invention for modeling and determining generator operation based on prior and current generator commitment, startup, and shutdown status. The exemplary system 100 has a processor 102, a generator output 104, and a time counter 106. The processor 102 loads and stores the variables of the system in three databases. The commitment status variable database 108 stores the commitment status variables. The startup status variables and shutdown status variables are stored, respectively, in the startup status variable database 110 and shutdown status variable database 112. Although the exemplary system 100 depicts the three databases as separate databases, it should be apparent that the three databases can be combined into a single storage database. The exemplary system 100 communicates to a user with a display 114 and various input/output devices. The exemplary system 100 is not limited to the components shown in FIG. 1. A variety of other devices may also be incorporated. For example, an additional database can be used to store previous variables from prior cycles or other variables that summarize prior generator history.

The exemplary system 100 may be used to implement the methods described in FIGS. 2-6. The exemplary system 100 can be initiated when the generator output 106 signals the processor 102 that the generator has initiated a new processing cycle. When the generator initiates a cycle, the processor may initiate the time counter 106. The startup status variables, shutdown status variables, and commitment status variables may be set equal to specified values during the cycle. The status variables may be stored within the processor 102 or a database connected to the processor 102. The status variables may also be signaled to the processor 102 from the generator output 104.

During the cycle, the processor 102 sets the status variables associated with the current time increment of the time counter equal to a value specified in the generator output 104 or other external sources. The processor 102 then may calculate the minimum operation and shutdown times for the generator. The processor may also routinely or continuously ensure that the startup constraints and shutdown constraints are accurate.

Architecturally, aspects of the invention can be located on a server, workstation, minicomputer, or mainframe. The processor may be a part of a general purpose computer with the databases stored in memory associated with the general purpose computer. One or more input and/or output (I/O) devices (or peripherals) may be communicatively coupled via a local interface. The local interface can be, for example, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connection to enable appropriate communications among the components of a network. The systems and methods may be hardwired with the computer to allow it to perform various aspects of the invention.

The systems and methods may also be incorporated in software used with a computer. The software may be stored or loaded in the memory and may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services. The system and method may also include a Graphic User Interface (GUI) to allow the user to edit variables or the various constraints. The GUI may provide a user-friendly interface which allows a user to enter model data and calculate startup costs for experiential data.

Figure 2:
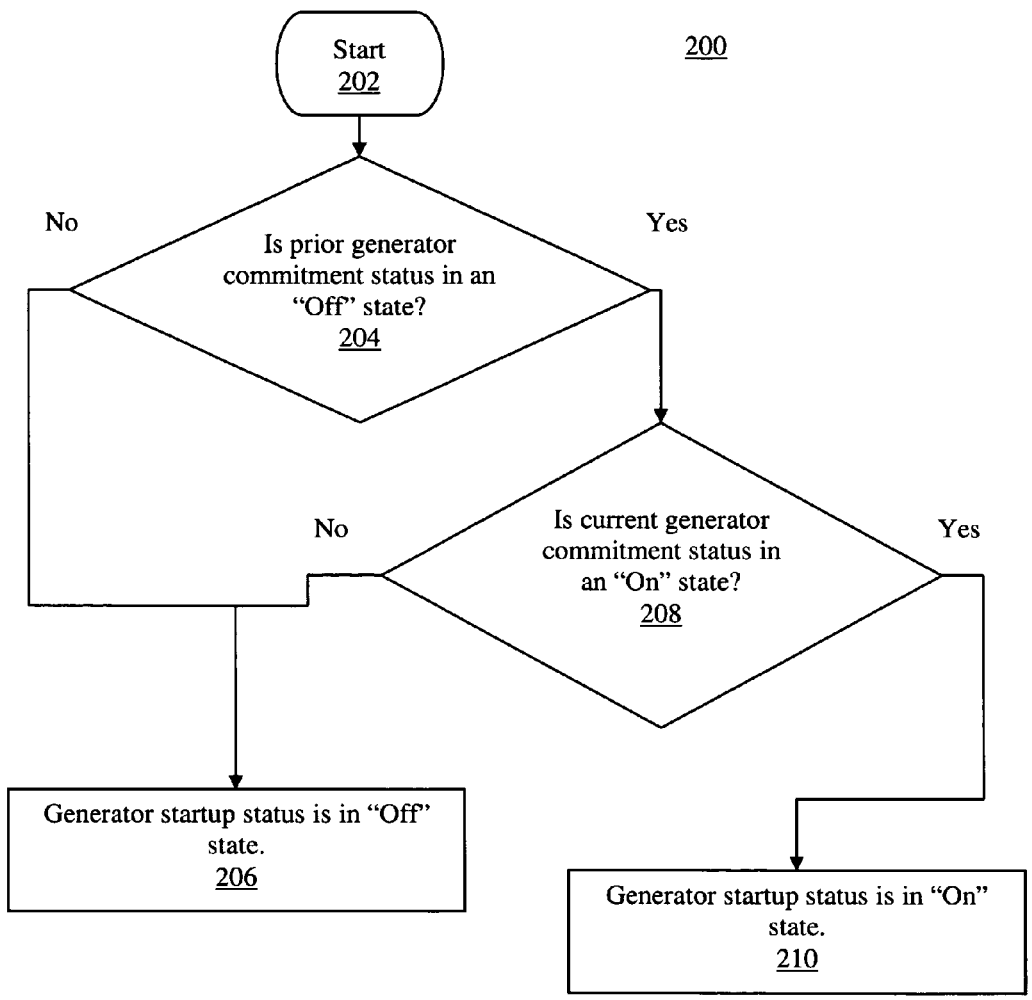
FIG. 2 is a flow chart illustrating an exemplary startup status routine 200 for modeling and determining generator operation in accordance with the principles of the present invention.

FIG. 2 is a flow chart illustrating an exemplary startup status routine 200 for modeling and determining the generator startup status using the defined variables and the three exemplary startup constraints. According to the exemplary startup status routine 200, the method is initiated (block 202) when the processor receives the signal that the generator has started a cycle. The method checks to see if the prior generator commitment status is in an "off" state (block 204).

If the prior generator commitment status is in an "on" state ("No" branch of block 204), the method may set the startup status to an "off" state (block 206). If the prior generator commitment status is in an "off" state ("Yes" branch of block 204), the method checks to see if the current generator commitment status is in an "on" state (block 208). If the current generator commitment status is in an "off" state ("No" branch of block 208), the method may set the startup status to an "off" state (block 206). If the current generator commitment status is in an "on" state ("Yes" branch of block 208), the method may set the startup status to an "on" state (block 210). The exemplary method determines the startup status of the generator based on the previous and current commitment status.

Figure 3:
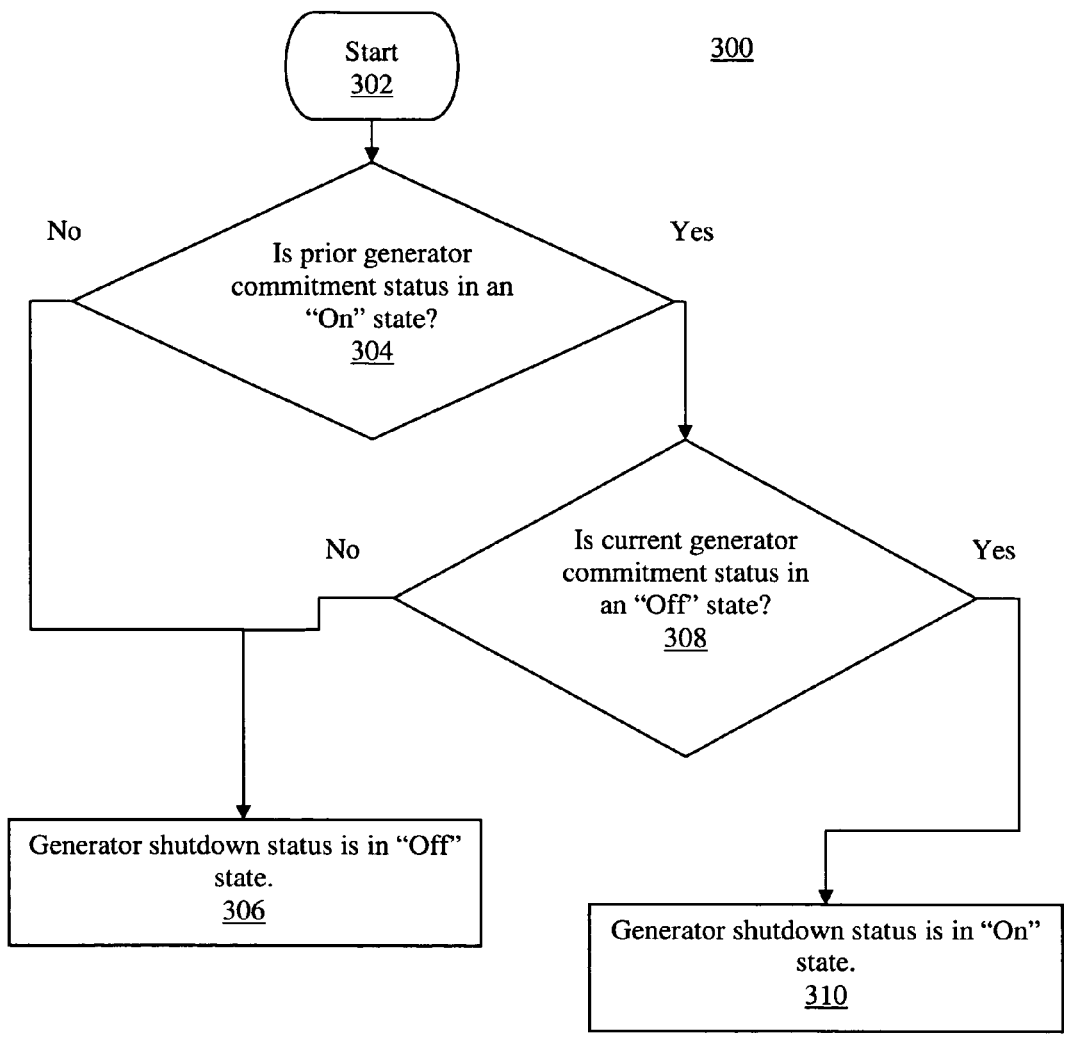
FIG. 3 is a flow chart illustrating an exemplary shutdown status routine 300 for modeling and determining generator shutdown status based on prior and current generator commitment status in accordance with the principles of the present invention.

FIG. 3 is a flow chart illustrating an exemplary shutdown status routine 300 for modeling and determining generator shutdown status using the defined variables and the three exemplary shutdown constraints. According to the exemplary shutdown status routine 300, the method is initiated (block 302) when the processor receives the signal that the generator has started a cycle. The method checks to see if the prior generator commitment status is in an "on" state (block 304).

If the prior generator commitment status is in an "off" state ("No" branch of block 304), the method may set the shutdown status to an "off" state (block 306). If the prior generator commitment status is in an "on" state ("Yes" branch of block 304), the method checks to see it the current generator commitment status is in an "off" state (block 308). If the current generator commitment status is in an "on" state ("No" branch of block 308), the method may set the shutdown status to an "off" state (block 306). If the current generator commitment status is in an "off" state ("Yes" branch of block 308), the method may set the shutdown status to an "on" state (block 310). The exemplary method determines the shutdown status of the generator based on the previous and current commitment status.

Figure 4:
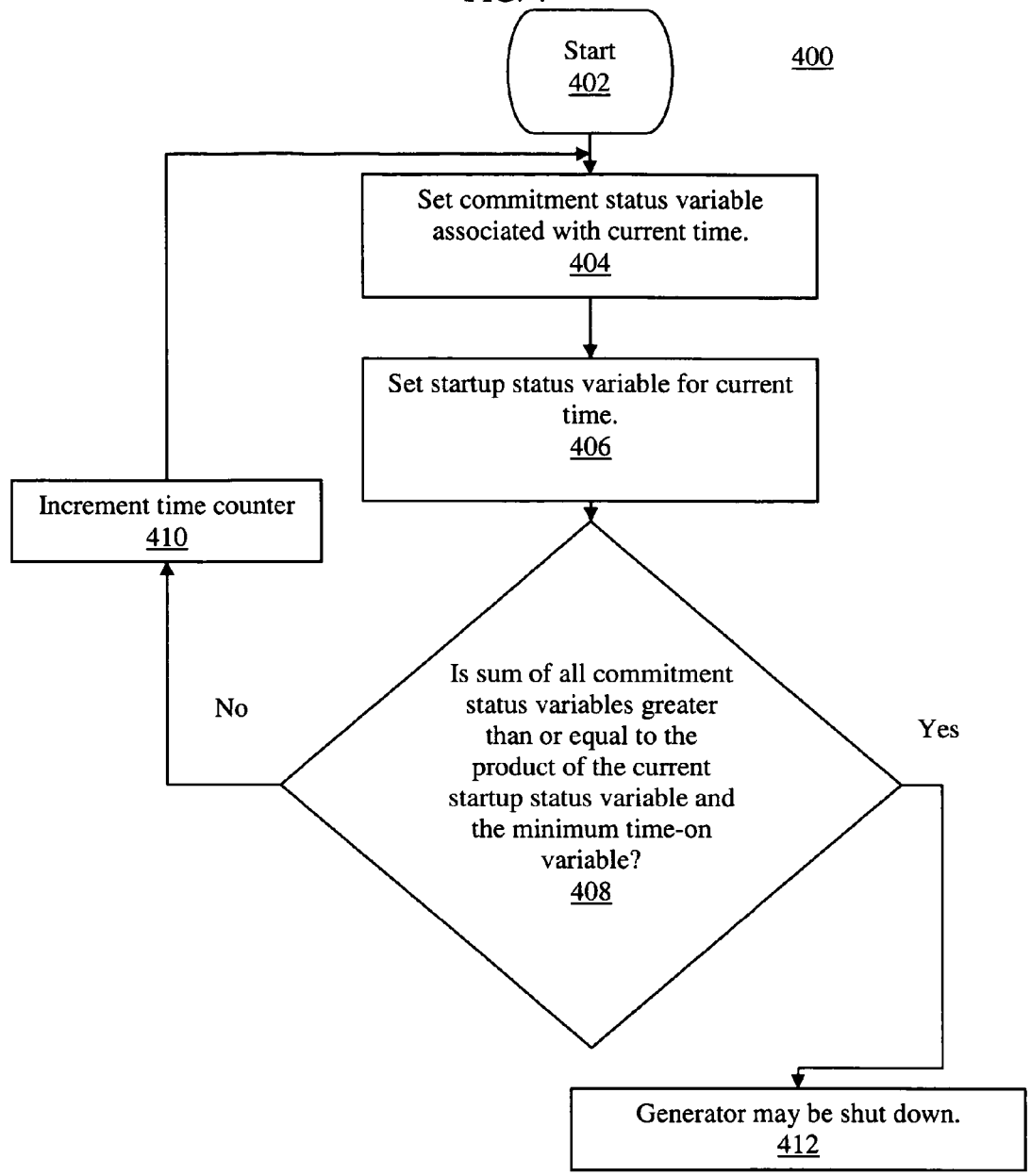
FIG. 4 is a flow chart illustrating an exemplary operation time routine 400 for modeling and determining a minimum operation time for a generator in accordance with the principles of the present invention.

FIG. 4 is a flow chart illustrating an exemplary operation time routine 400 for modeling and determining a minimum operation time for a generator in accordance with the principles of the present invention. According to the exemplary operation time routine 400, the method begins the shutdown determination process (block 402). The method may set the commitment status variable associated with the current time increment (block 404). The commitment status of the generator may be provided from the generator or other external algorithms associated with operation of the generator. The method may set the startup status variable for the current time (block 406). The startup status variable may be determined as previously discussed in the routine associated with FIG. 3.

The method checks to see if the sum of all commitment status variables is greater than or equal to the product of the current startup status variable and the minimum time-on variable (block 408). If the sum is less than the product of the current startup status variable and the minimum time-on variable ("No" branch of block 408), the method waits for the next increment of time by the time counter (block 410). The method then cycles back through and sets the commitment status variable and startup status variable associated with the next time increment (blocks 404 and 406). If the sum is greater than or equal to the product of the current startup status variable and the minimum time-on variable ("Yes" branch of block 408), the generator may be shut down (block 412). It is not mandatory that the generator be shutdown. The exemplary method may provide the minimum operation time. The minimum operation time is the minimum time the generator can operate prior to shutting down the generator. Other algorithms or variables may be used to determine when to shut down the generator after the minimum operation time occurs.

Figure 5:
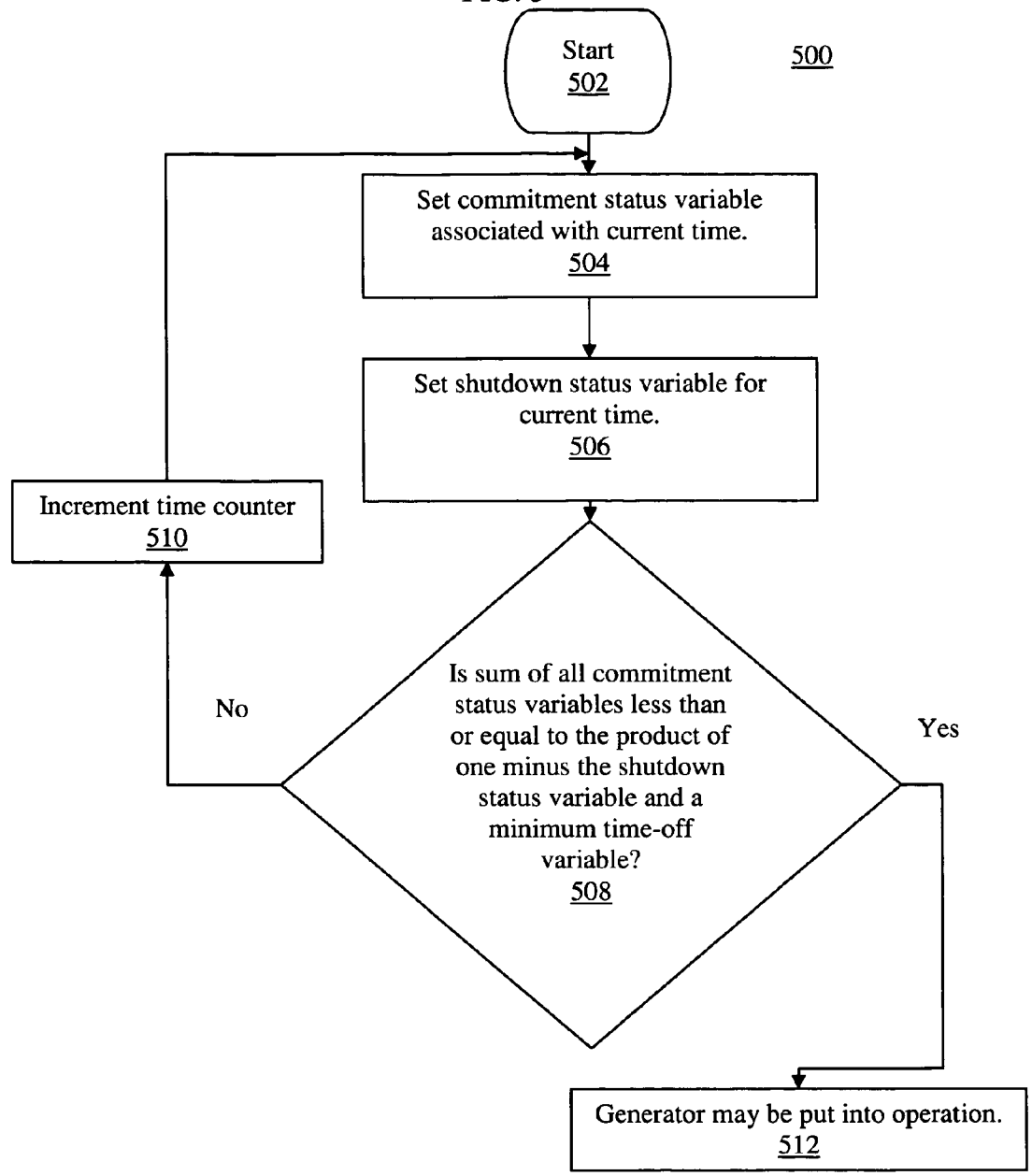
FIG. 5 is a flow chart illustrating an exemplary shutdown time routine 500 for modeling and determining a minimum shutdown time for a generator in accordance with the principles of the present invention.

FIG. 5 is a flow chart illustrating an exemplary shutdown time routine 500 for modeling and determining a minimum shutdown time for a generator in accordance with the principles of the present invention. According to the exemplary shutdown time routine 500, the method begins the shutdown determination process (block 502). The method may set the commitment status variable associated with the current time increment (block 504). The commitment status of the generator may be provided from the generator or other external algorithms associated with operation of the generator. The method may set the shutdown status variable for the current time (block 506). The shutdown status variable may be determined as previously discussed in the routine associated with FIG. 4.

The method checks to see if the sum of all commitment status variables is less than or equal to the product of one minus the shutdown status variable and a minimum time-off variable (block 508). If the sum is greater than the product ("No" branch of block 508), the method waits for the next increment of time by the time counter (block 510). The method then cycles back through and sets the commitment status variable and shutdown status variable associated with the next time increment (blocks 504 and 506). If the sum is less than or equal to the product ("Yes" branch of block 508), the generator may be put into operation (block 512). It is not mandatory that the generator be put into operation. The exemplary method may provide the minimum shutdown time. The minimum shutdown time is the minimum time the generator can shut down prior to operating the generator. Other algorithms or variables may be used to determine when to put the generator into operation after the minimum shutdown time occurs.

FIG. 6 is a flow chart illustrating an alternate exemplary shutdown time routine 600 for modeling and determining a minimum shutdown time for a generator. According to the alternate exemplary shutdown time routine 600, the method begins the shutdown determination process (block 602). The method may set the commitment status variable associated with the current time increment (block 604). The commitment status of the generator may be provided from the generator or other external algorithms associated with operation of the generator. The method may set the shutdown status variable for the current time (block 606). The shutdown status variable may be determined as previously discussed in the routine associated with FIG. 4.

The method checks to see if the sum of the shutdown status variables subsequent to the shutdown status variable that occurs after the current time increment minus a minimum shutdown time is less than or equal to one minus the commitment status variable (block 608). If the sum is greater ("No" branch of block 608), the method waits for the next increment of time by the time counter (block 610). The method then cycles back through and sets the commitment status variable and shutdown status variable associated with the next time increment (blocks 604 and 606). If the sum is less than or equal to one minus the commitment status variable ("Yes" branch of block 608), the generator may be put into operation (block 612). As previously discussed in the exemplary shutdown time routine 500, it is not mandatory that the generator be put into operation.

The exemplary methods discussed may be used in combination or independently of each other. It will be understood that the foregoing is only illustrative of the principles of the invention and that various modifications can be made by those skilled in the art without departing from the scope and spirit of the invention. Accordingly, such embodiments will be recognized as within the scope of the present invention. Persons skilled in the art will appreciate that the present invention can be practiced by other than the described embodiments, which are presented for purposes of illustration rather than of limitation and that the present invention is limited only by the claims that follow.

What is claimed is:

1. A method for controlling generator operation comprising:
    assigning a binary value to one or more commitment status variables indicative of whether a generator is committed for being operated, each commitment status variable associated with an increment of time;
    assigning a binary value to a time-dependent startup status variable indicative of whether the generator is in a process of being started up, wherein the startup status variable minus a current commitment variable plus a subsequent previous commitment status variable is greater than or equal to zero, the startup status variable plus the subsequent previous commitment status variable is less than or equal to one, and the startup status variable minus the current commitment status variable is less than or equal to zero;
    determining a generator operation constraint responsive to the binary value assigned to the one or more commitment status variables and the binary value assigned to the time-dependent startup status variable; and
    using the generator operation constraint for controlling operation of the generator to optimize at least one of a shutdown time and an operating time of the generator.

2. The method of claim 1, wherein the sum of all commitment status variables is greater than or equal to the product of the startup status variable and a minimum time-on variable wherein the minimum time-on variable is equal to a minimum operation time for the generator.

3. The method of claim 1, further comprising:
    assigning a binary value to one or more time-dependent shutdown status variables wherein the shutdown status variable plus the current commitment status variable minus the subsequent previous commitment status variable is greater than or equal to zero, the shutdown status variable minus the subsequent previous commitment status variable is less than or equal to zero, and the shutdown status variable plus the current commitment status variable is less than or equal to one.

4. The method of claim 3, wherein the sum of all commitment status variables is less than or equal to the product of one minus the shutdown status variable and a minimum time-oft variable wherein the minimum time-off variable is equal to a minimum shutdown time for the generator.

5. The method of claim 3, wherein the sum of shutdown status variables subsequent to the shutdown status variable that occurs after the current time increment minus a minimum shutdown time is less than or equal to one minus the commitment status variable wherein the minimum time-off variable is equal to a minimum shutdown time for the generator.

6. The method of claim 1, wherein the one or more commitment status variables is equal to either a zero value or a one value.

7. The method of claim 1, wherein the startup status variable is continuous.

8. The method of claim 3, wherein the one or more shutdown status variables are continuous.

9. A method for controlling generator operation comprising:
    assigning a binary value to one or more commitment status variables indicative of whether a generator is committed for being operated each commitment status variable associated with an increment of time;
    assigning a binary value to one or more time-dependent shutdown status variables indicative of whether the generator is in a process of being shut down, wherein the shutdown status variable plus the current commitment status variable minus the subsequent previous commitment status variable is greater than or equal to zero, the shutdown status variable minus the subsequent previous commitment status variable is less than or equal to zero, and the shutdown status variable plus the current commitment status variable is less than or equal to one;
    determining a generator operation constraint responsive to the binary value assigned to the one or more commitment status variables and the binary value assigned to the time-dependent shutdown status variable; and
    using the generator operation constraint for controlling operation of the generator to optimize at least one of a shutdown time and an operating time of the generator.

10. The method of claim 9, wherein the sum of all commitment status variables is less than or equal to the product of one minus the shutdown status variable and a minimum time-off variable wherein the minimum time-off variable is equal to a minimum shutdown time for the generator.

11. The method of claim 9, wherein the sum of shutdown status variables subsequent to the shutdown status variable that occurs after the current time increment minus a minimum shutdown time is less than or equal to one minus the commitment status variable wherein the minimum time-off variable is equal to a minimum shutdown time for the generator.

12. The method of claim 9, wherein the one or more commitment status variables is equal to either a zero value or a one value.

13. The method of claim 9, wherein the one or more shutdown status variables are continuous.

14. A system for controlling generator operation comprising:
- a means for assigning a binary value to one or more commitment status variables indicative of whether a generator is committed for being operated, each commitment status variable associated with an increment of time based on one or more received commitment status signals;
- a means for assigning a binary value to a time-dependent startup status variable indicative of whether the generator is in a process of being started up, wherein the startup status variable minus the current commitment variable plus the subsequent previous commitment status variable is greater than or equal to zero, the startup status variable plus the subsequent previous commitment status variable is less than or equal to one, and the startup status variable minus the current commitment status variable is less than or equal to zero;
- a means for determining a generator operation constraint responsive to the binary value assigned to the one or more commitment status variables and the binary value assigned to the time-dependent startup status variable; and
- a means for producing a generator control signal responsive to the generator operation constraint for use in controlling operation of the generator to optimize at least one of a shutdown time and an operating time of the generator.

15. The system of claim 14, wherein the sum of all commitment status variables is greater than or equal to the product of the startup status variable and a minimum time-on variable wherein the minimum time-on variable is equal to a minimum operation time for the generator.

16. The system of claim 14, further comprising:
- a means for assigning a binary value to one or more time-dependent shutdown status variables wherein the shutdown status variable plus the current commitment status variable minus the subsequent previous commitment status variable is greater than or equal to zero, the shutdown status variable minus the subsequent previous commitment status variable is less than or equal to zero, and the shutdown status variable plus the current commitment status variable is less than or equal to one.

17. The system of claim 16, wherein the sum of all commitment status variables is less than or equal to the product of one minus the shutdown status variable and a minimum time-off variable wherein the minimum time-off variable is equal to a minimum shutdown time for the generator.

18. The system of claim 16, wherein the sum of shutdown status variables subsequent to the shutdown status variable that occurs after the current time increment minus a minimum shutdown time is less than or equal to one minus the commitment status variable wherein the minimum time-off variable is equal to a minimum shutdown time for the generator.

19. The system of claim 14, wherein the startup status variable is continuous.

20. The system of claim 16, wherein the one or more shutdown status variables are continuous.

* * * * *